United States Patent [19]

Crabb et al.

[11] Patent Number: 4,955,442
[45] Date of Patent: Sep. 11, 1990

[54] STEERING MECHANISM FOR A VEHICLE

[75] Inventors: Elmer R. Crabb, Aurora; William J. Spivey, Joliet, both of Ill.

[73] Assignee: Caterpillar Inc., Peoria, Ill.

[21] Appl. No.: 353,302

[22] Filed: May 16, 1989

[51] Int. Cl.⁵ .................. B62D 1/12; B62D 11/18
[52] U.S. Cl. .................. 180/6.44; 60/444; 137/636
[58] Field of Search .......... 180/6.2, 6.24, 6.3, 180/6.44, 6.48, 132; 60/421, 443, 444; 74/388 PS, 682, 720.5; 137/636

[56] References Cited

U.S. PATENT DOCUMENTS

| | | | |
|---|---|---|---|
| 3,357,509 | 12/1967 | Gustafsson et al. | 180/6.44 |
| 3,369,419 | 2/1968 | Henstrom et al. | 74/720.5 |
| 3,543,515 | 12/1970 | Kempson | 60/52 |
| 3,938,604 | 2/1976 | Kugler et al. | 180/6.44 |
| 4,080,992 | 3/1978 | Niederer | 137/636 |
| 4,434,680 | 3/1984 | Riediger et al. | 74/682 |
| 4,458,485 | 7/1984 | Seelmann | 60/421 |
| 4,599,855 | 7/1986 | Seelmann | 60/421 |
| 4,700,794 | 10/1987 | Bernhagen et al. | 180/6.44 |

FOREIGN PATENT DOCUMENTS 2517327 10/1976 Fed. Rep. of Germany ...... 137/636

Primary Examiner—Mitchell J. Hill
Attorney, Agent, or Firm—Charles E. Lanchantin, Jr.

[57] ABSTRACT

A vehicular steering mechanism of overly complex construction is known which displaces a left turn control valve or a right turn control valve through separated cams in response to the rotation of a steering wheel. The subject steering mechanism is simpler, more economical and more compact by including an input shaft and a single actuating cam which are conjointly rotatable away from a neutral position in either direction. The actuating cam defines a profiled guide slot of a substantially spiral shape, and a cam follower assembly is cooperatively associated therewith including a cam following roller wheel that is received in the profiled guide slot. The cam follower assembly includes a bellcrank supporting the roller wheel and indirectly connected to a left turn control valve and a right turn control valve. The vehicle is steered by the controlled rotation of the bellcrank and the subsequent displacement of the control valves and. The steering mechanism also includes an effective centering and stop assembly.

15 Claims, 5 Drawing Sheets

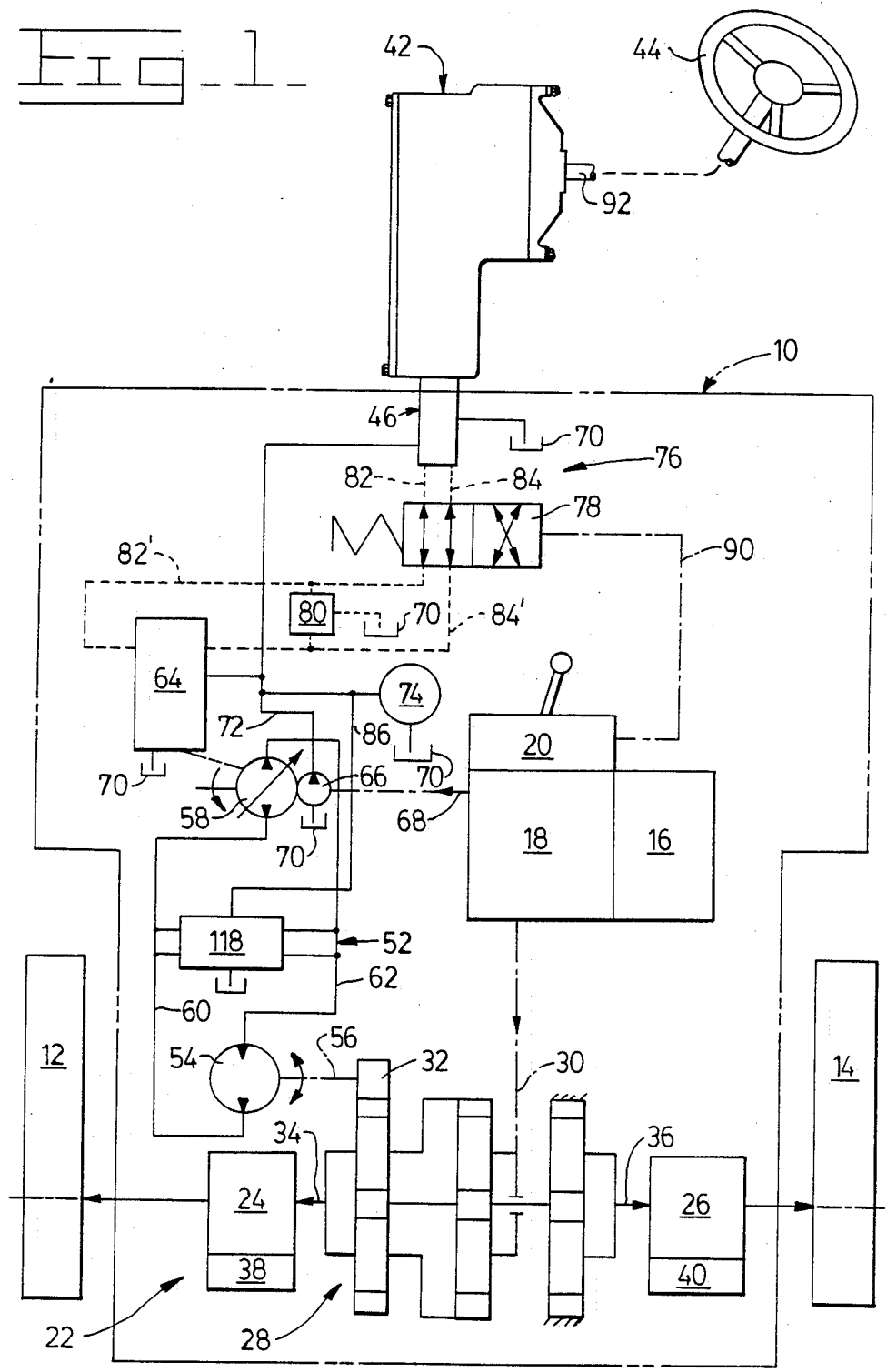

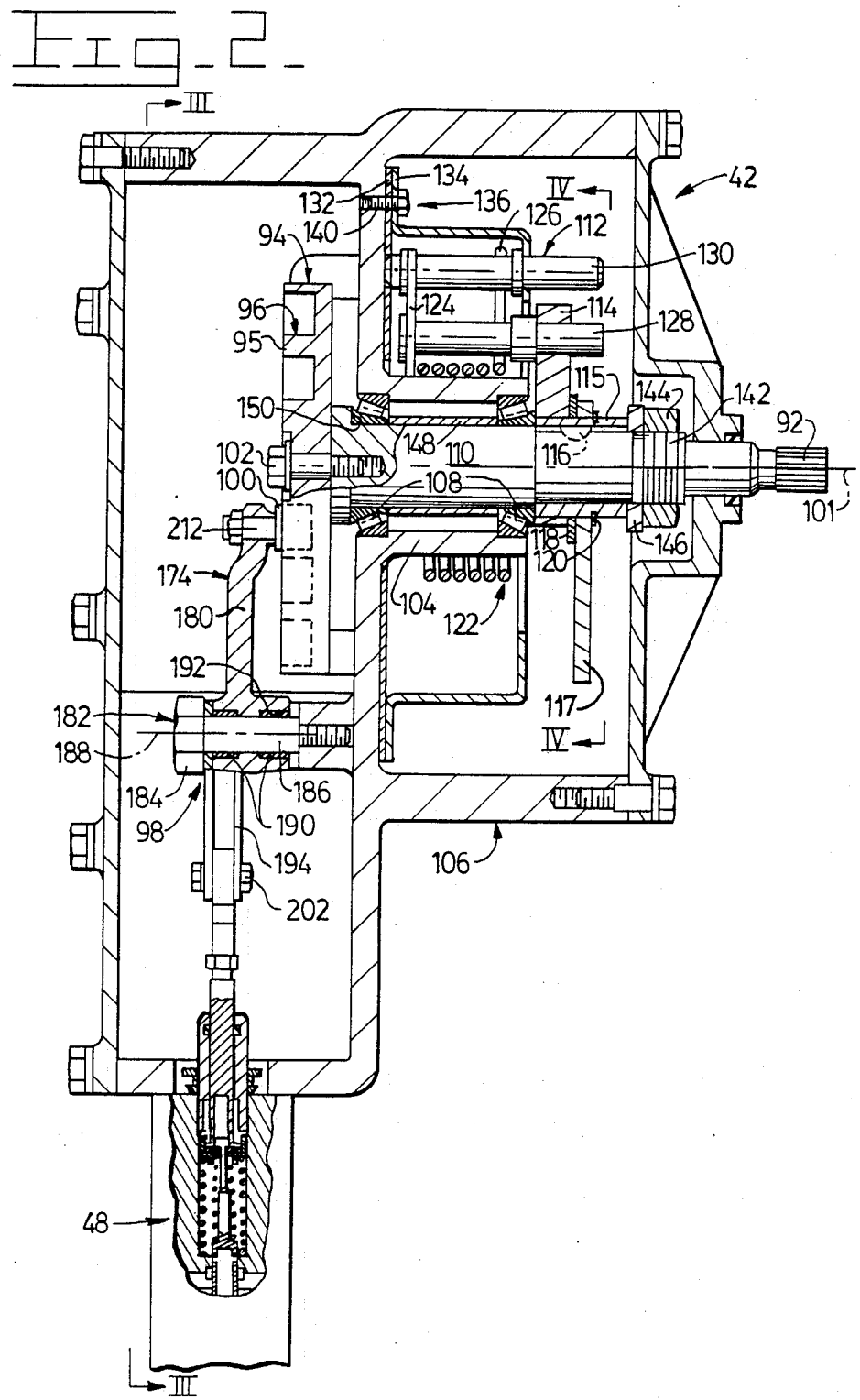

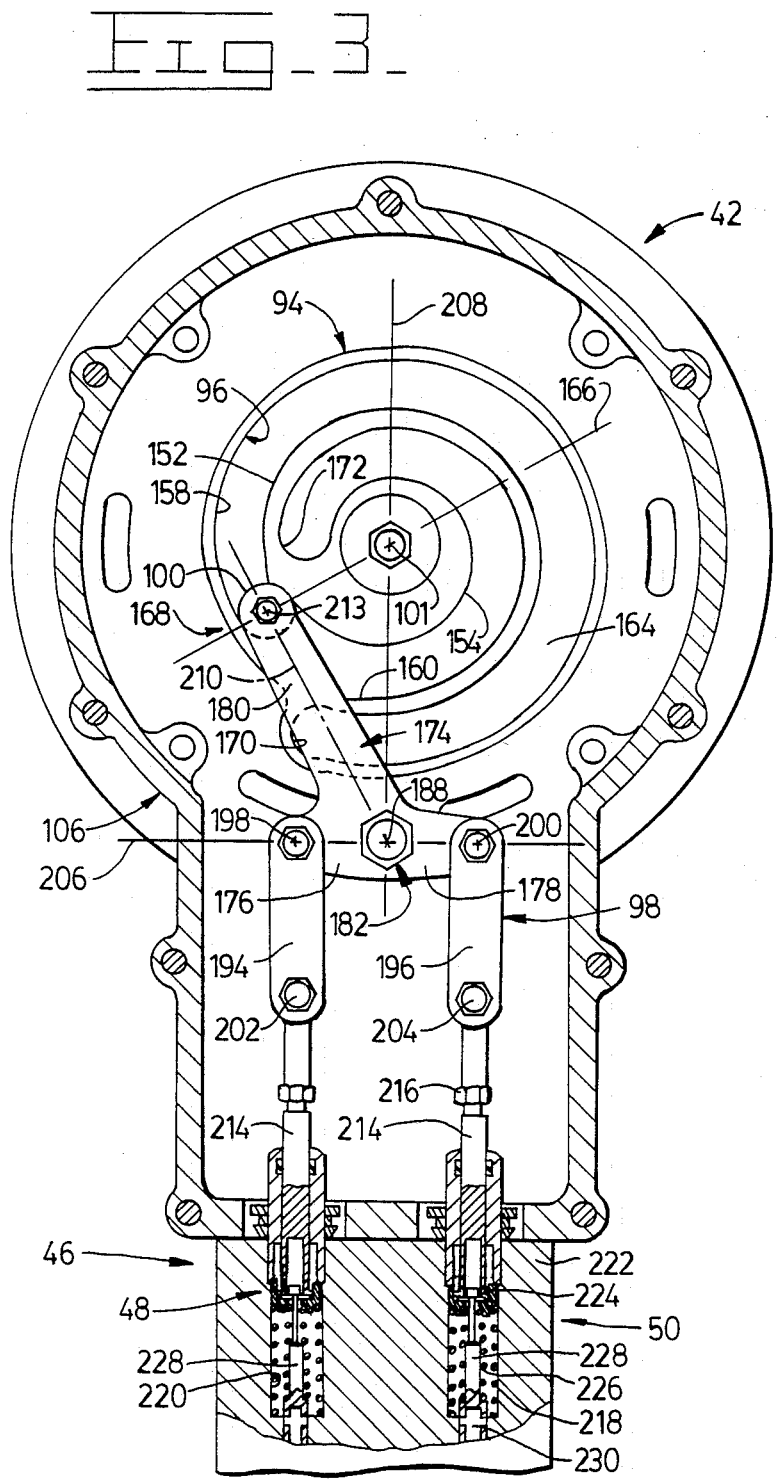
Fig_3.

Fig_4_
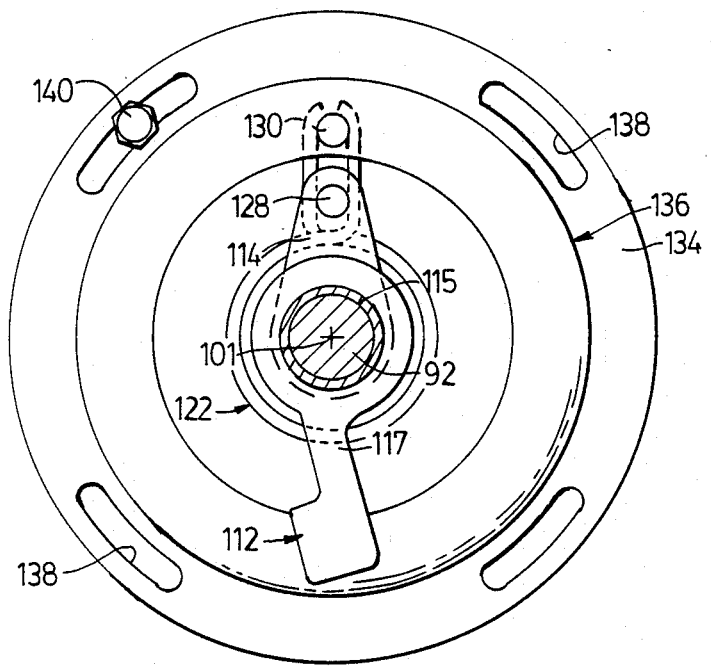
Fig_5_
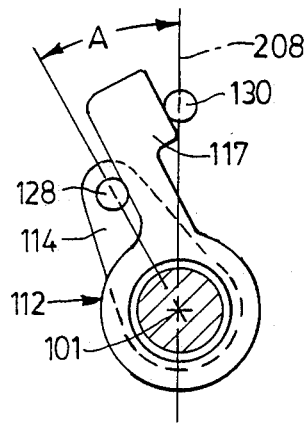

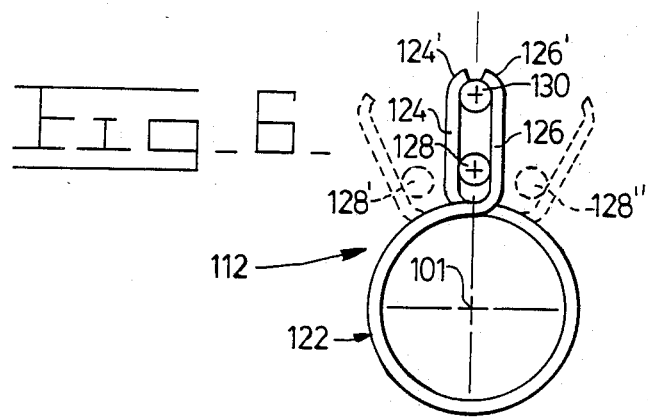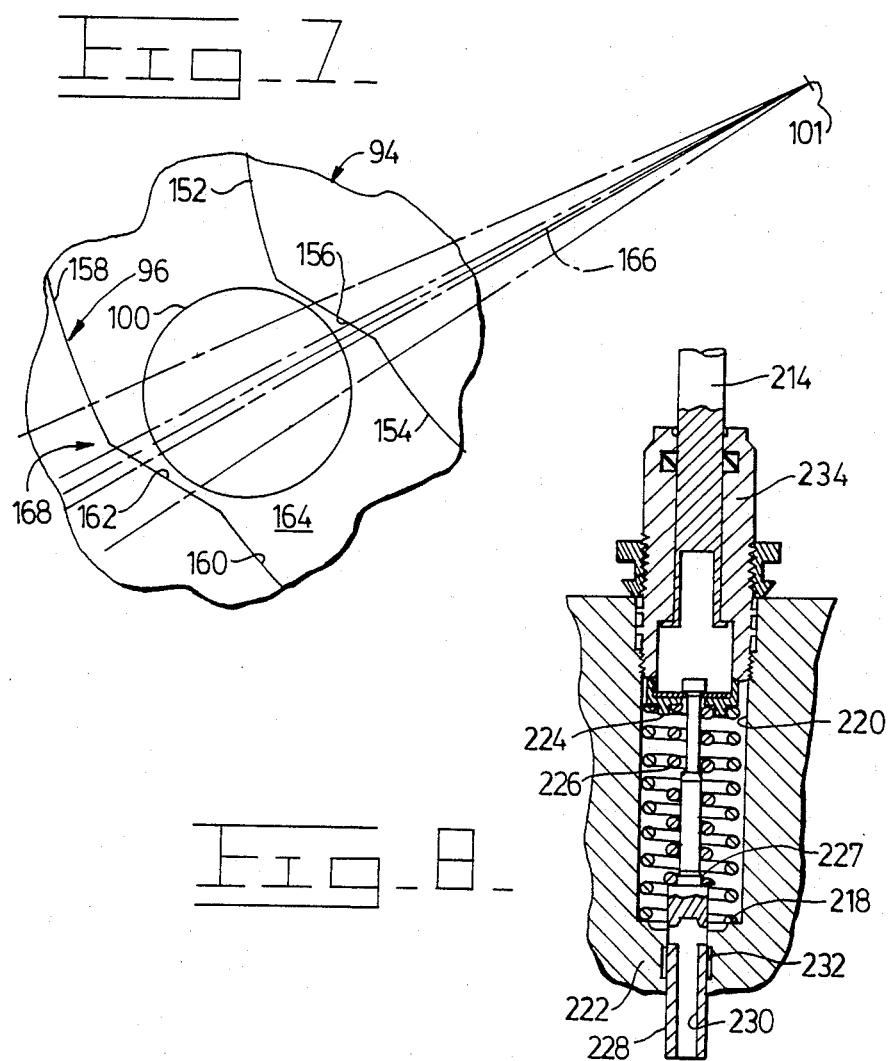

STEERING MECHANISM FOR A VEHICLE

TECHNICAL FIELD

This invention relates to a steering mechanism adapted for controllably turning an earthmoving tractor, agricultural vehicle or the like, and more specifically to a steering mechanism of particularly simple and effective construction for controllably displacing a left turn control valve and a right turn control valve in response to the rotation of an input control member such as a steering wheel.

BACKGROUND ART

U.S. Pat. No. 4,700,794 issued to J. R. Bernhagen, et al. on Oct. 20, 1987, and assigned to the Assignee of the present invention, illustrates a steering mechanism for converting the rotational movement of a steering wheel to linear actuation of one or the other of a pair of juxtaposed turn control valves. That steering mechanism has proven to be extremely effective and reliable in operation. For example, it has a reasonable steering force range for the associated steering ratio, a relatively fast rate of response with a relatively small steering wheel deadband at the centered position thereof, and a very desirable modulation rate or rate of moving the left and right turn control valves.

Unfortunately, the steering mechanism of U.S. Pat. No. 4,700,794 is overly complex and requires an excessive amount of space. So what is needed is a simpler, more compact and more economical steering mechanism that will provide substantially the same operating characteristics as that patent.

The present invention is directed to overcoming one or more of the problems as set forth above.

DISCLOSURE OF THE INVENTION

In one aspect of the present invention, a vehicular steering mechanism is provided for converting the rotational movement of an input control member to the controlled displacement of a left turn control valve and a right turn control valve. Specifically, the steering mechanism includes an input shaft and an actuating cam connected to the shaft such that they are rotatable in either direction away from a centered position in response to the rotation of the input control member. And, a cam follower assembly is provided for controllably displacing the control valves including a cam follower element which is received in a guide slot defined in the actuating cam.

In another aspect of the present invention, a steering mechanism of a vehicle converts the rotational movement of a steering wheel to the controlled displacement of a left turn control valve and a right turn control valve by including an input shaft, an actuating cam defining a single profiled gudie slot jointly rotatable with the input shaft in either direction away from the centered position in response to the rotation of the steering wheel, and a cam follower assembly including a cam follower element received in the guide slot for pulling one and pushing the other of the control valves and thereby effecting steering of the vehicle.

Advantageously, the steering mechanism of the present invention controllably displaces the respectively chosen turn control valve at the desired rate, and accomplishes this with a construction that is more simple and compact than the steering mechanism disclosed in U.S. Pat. No. 4,700,794. For example, it has considerably fewer parts.

BRIEF DESCRIPTION OF THE DRAWINGS

FIG. 1 is a diagrammatic plan view of a vehicle incorporating the steering mechanism of the present invention;

FIG. 2 is a diagrammatic and enlarged cross sectional view of the steering mechanism shown in FIG. 1 in a centered position thereof with certain portions shown in elevation, and with other portions broken away to show details of construction thereof;

FIG. 3 is a left hand end view of the steering mechanism as taken along the section line III—III of FIG. 2;

FIG. 4 is a right hand end view of the steering mechanism as taken along the section line IV—IV of FIG. 2 and showing only diagrammatically the primary elements of the centering means;

FIG. 5 is a diagrammatic view similar to FIG. 4, only showing certain elements in a rotated sense at one limit of travel thereof;

FIG. 6 is an enlarged, fragmentary portion of the steering mechanism's centering and stop assembly showing only diagrammatically the torsion spring and the relationship thereof to a radially inner actuating post and a radially outer reaction post operationally associated therewith;

FIG. 7 is a substantially enlarged fragmentary view showing the central portion of the profiled guide slot in the actuating cam to better define the surfaces thereof; and FIG. 8 is an enlarged cross sectional view of one of the turn control valves shown in FIGS. 2 and 3.

BEST MODE FOR CARRYING OUT THE INVENTION

An earthmoving or agricultural work vehicle, as is generally indicated by the reference number 10 in FIG. 1, includes a pair of ground-engaging tracks or belts 12 and 14 for propelling it. The vehicle includes an engine 16, a reversible powershift transmission 18 driven by the engine and having an associated transmission control device 20, and a cross drive mechanism or transaxle 22 including left and right final drives 24 and 26 respectively.

The cross drive mechanism 22 preferably employs a planetary steering differential 28 of a known type such as is disclosed in U.S. Pat. No. 4,434,680 issued to C. W. Reidiger et al. on Mar. 6, 1984 and which is powerably driven by first input drive members 30 and 32. First and and second output members 34 and 36 extend from the differential and powerably drive the left and right final drives respectively. A left service brake 38 and a right service brake 40 are associated with the respective final drives 24 and 26 so as to selectively stop movement of the tracks 12 and 14 in the usual manner. During straight line movement of the vehicle 10, the first input drive member 30 is powerably driven by the powershift transmission 18 at one of a plurality of forward speeds or reverse speeds.

A steering mechanism 42 constructed in accordance with the present invention is operatively connected between a steering input control member or steering wheel 44 and a control valve assembly indicated generally by the reference number 46. More specifically, the steering mechanism 42 is effective to convert the rotational movement of the steering input control member 44 to the controlled displacement of a left turn control valve 48 and a right turn control valve 50 of the control valve assembly 46 as is illustrated in FIGS. 3 and 8. These control valves are of identical construction and are effective to provide pilot pressure signals proportionate to the displacement thereof for operating a pump and motor system 52. In turn, the pump and motor system shown in FIG. 1 controllably and bidirectionally applies torque to the second input drive member 32 for steering the vehicle 10, or for holding that input drive member stationary for straight line movement thereof.

If straight ahead operation is desired, the steering input control member 44 is held in a centered or neutral position whereby the pump and motor system 52 is actuated to hold a conventional, fixed displacement hydraulic steering motor 54, its associated output shaft 56, and the second input drive member 32 stationary. Under these circumstances the left and right differential output members 34 and 36 are simultaneously driven in the same rotational direction at the same speed, and at equal levels of torque.

If turning of the vehicle 10 is desired, the steering motor 54, the output shaft 56, and the second input drive member 32 are controllably rotated in the selected direction at the desired speed in response rotation of the steering input control member 44 in either direction away from its central position. This additional input to the planetary steering differential 28 can cause the left output member 34 to increase in speed the same relative amount as the right output member 36 decreases in speed, or vice versa to result in a turning motion of the vehicle.

The pump and motor system 52 can be of a conventional or known construction, such as is disclosed in previously noted U.S. Pat. No. 4,700,794. As is illustrated in FIG.1, however, such construction includes a conventional, over-center, variable displacement hydraulic steering pump 58 which is hydraulically coupled to the steering motor 54 through a pair of hydraulic lines 60 and 62. The steering pump 58 has a pump displacement control 64 operatively associated with a control element thereof and normally constituted by a pump swash plate or wobble plate, not shown. The steering pump 58 and an associated charging pump 66 are mechanically driven by the engine 16 and/or transmission 18 through an intermediate drive train 68 as is diagrammatically illustrated. The charging pump 66 draws in hydraulic fluid from a reservoir 70 and delivers it to a distribution conduit or manifold 72 at a controlled pressure, for example about 2,400 kPa (350 psi), as established by a conventional pressure relief valve 74. From the manifold 72 pressurized fluid is directed to the pump displacement control 64 and to a control valve group 76 including the control valve assembly 46, a diverter valve 78, and a shuttle dump valve 80. First and second pilot lines 82 and 84 which are shown in broken lines in FIG. 1 extend between the control valve assembly 46 and the pump displacement control 64 for the controlled operation thereof. The pump displacement control 64 for the over-center steering pump 58 is responsive to relatively moderate pressure levels in the first and second pilot lines 82 and 84 for delivering relatively high pressure fluid to the steering motor 54 via the lines 60 and 62. In response to a shift of the transmission control device 20 to a reverse mode of operation of the vehicle, a pressure signal is generated in a line 90 which repositions the diverter valve 78 and thereby cross-connects lines 82 and 84', and lines 84 and 82' respectively so as to provide automotive type steering wherein the vehicle travels over the same turning path when a directional change is made.

The steering mechanism 42 shown in FIGS. 2 and 3 mechanically converts the rotational movement of an input shaft 92 to linear displacement of the side-by-side turning control valves 48 and 50. This is accomplished by the cooperation of an actuating cam 94 having a planar face 95 normal to the central axis 101 and defining an elongate profiled guide slot 96 therein, and cam follower means or a cam follower assembly 98 including a cam follower element 100 which is received in and travels along the guide slot. The input shaft 92 is connected in any conventional manner for joint rotation with the input control member or steering wheel 44, and can be rotated about a central axis 101 through a first angular range of approximately 330 degrees from the centered neutral position thereof for turning the vehicle in one direction, or through a second angular range of similar extent for turning the vehicle in the other direction. Such large ranges are particularly desirable for obtaining precise displacement of the turning control valves 48 and 50.

The input shaft 92 and the actuating cam 94 are releasably secured together by one or more fasteners or bolts 102 which extend through the actuating cam and are screwthreadably received in the input shaft.

The input shaft 92 is rotatably mounted within a tubular portion 104 of a supporting housing 106 as by an opposed pair of tapered roller bearings 108 seated on a cylindrical surface 110 of the input shaft. Also, the steering mechanism 42 includes centering means or a centering and stop assembly 112 for returning the actuating cam 94 to the central position thereof, and including a centering lever 114 rigidly secured to and extending radially outwardly from a cylindrical sleeve 115. The sleeve is in turn secured for conjoint rotation with the input shaft 92, as by a key-type interlock 116. Moreover, a radially outwardly extending spacer or stop element 117 is mounted for free rotation about the central axis 101 on the sleeve 115. A ring or washer 118 is disposed on the sleeve 115 intermediate the centering lever 114 and the stop element 117, and a split retaining ring 120 is releasably coupled to the sleeve in the usual groove formed therein axially outside of the stop element to contain the stop element axially on the sleeve.

Moreover, the centering and stop assembly 112 includes a torsion spring 122 that is disposed in a coiled and encircling relationship about the tubular portion 104 of the housing 106. As can be appreciated by reference to FIGS. 2 and 6, when the input shaft 92 is angularly centered to its neutral position the radially outwardly extending end portions 124 and 126 of the torsion spring 122 are profiled to be in tangential contact with a radially inner actuating post 128 rigidly secured to the centering lever 114, and with a radially outer reaction post 130 rigidly secured to the housing 106. It can further be noted that the end portions of the torsion spring 122 have arcuate outer ends 124' and 126' so as to extend partially around the stationary reaction post 130 for more positive anchoring thereof.

As is best shown in FIGS. 2 and 4, the reaction post 130 is adjustably connected to the housing 106 by being rigidly secured between a base plate 132 and a cover 134 of a plate assembly 136. The base plate 132 and cover 134 have a plurality of arcuate slots 138 therethrough so that a fastener or bolt 140 can extend through each slot, although only one is shown, and be screwthreadably secured to the support housing 106 and the plate assembly allowed to be limitedly rotated about the central axis 101 during initial assembly to index it angularly with respect to the centering lever 114 and the reaction post 130 prior to fully tightening the bolts 140. As can be noted, the actuating and reaction posts 128 and 130 are basically cylindrical pins which are held in parallel relation to the central axis and to each other by the plate assembly 136 and the centering lever 114 respectively.

The input shaft 92 also has a threaded portion 142 for receipt of a retaining nut 144. With screwthreaded installation of the nut a lockwasher and/or load ring 146 can be urged axially against the sleeve 115, the sleeve against the inner race of the outer bearing 108, and another spacer sleeve 148 urged against the inner race of the inner bearing 108 to position it against a shoulder 150 formed on the input shaft. In this way the tapered roller bearings can be properly adjusted.

Referring now to FIGS. 3 and 7, the elongate spiral guide slot or trough 96 of the actuating cam 94 winds generally about the central axis 101 and is defined by radially outwardly facing first and second inner wall surfaces 152 and 154 interconnected by an inner inclined ramp 156, radially inwardly facing first and second outer wall surfaces 158 and 160 interconnected by an outer inclined ramp 162, and a base surface 164 arranged in a plane normal to the central axis 101. A stationary central plane 166 passes through the central axis 101 and the inclined ramps 156 and 162 when the actuating cam is centered, and that centrally profiled portion of the actuating cam defines a slot transition portion 168 wherein the inclined ramps provide a more severe rate of response of the cam follower element 100 than the more gradual or modulated rate of movement due to the remaining wall surfaces 152, 154, 158, and 160. A semicylindrical outer end surface 170 and a semicylindrical inner end surface 172 join the inner and outer wall surfaces at the opposite ends of the guide slot 96, but do not provide a performance function.

Referring next to the cam follower assembly 98 shown in FIGS. 2 and 3, it includes a bellcrank 174 defining first and second legs 176 and 178, an actuating arm 180, and pivot means 182 for pivotally supporting the bellcrank on the supporting housing 106. In this instance the pivot means 182 includes a bolt or pivot pin 184 screwthreadably secured in the supporting housing 106 and defining a cylindrical surface 186 having a central axis 188 parallel to the axis 101 of the input shaft 92. A pair of needle bearing assemblies 190 are received within a stepped cylindrical bore 192 through the bellcrank 174, and these bearing assemblies are supported on the cylindrical surface 186 of the bolt. The first and second legs 176 and 178 are pivotally coupled to left and right intermediate links 194 and 196 through left and right pivot joints 198 and 200 respectively. In turn, the left link 194 is pivotally secured to the left turn control valve 48 by another pivot joint 202, and the right link 196 is pivotally secured to the right turn control valve 50 by another pivot joint 204. The pivot joints 198 and 200 are located at equal radial distances from the bellcrank pivot axis 188 and on a common plane 206 therewith, while the actuating arm 180 is not on a perpendicular bisector plane 208 that passes through the axes 101 and 188, but rather is on an inclined plane 210 that passes through the axis 188. In this embodiment the cam follower element 100 is a cylindrical roller wheel adapted to freely rotate on a stepped cylindrical pin 212 secured to the actuating arm 180 and to rotate about an axis 213 located on the inclined plane 210. When the actuating cam 94 is centered on the central plane 166, the included angle between the planes 208 and 210 is approximately 30 degrees in the specific embodiment illustrated.

As is shown in FIGS. 3 and 8, each of the turn control valves 48 and 50 includes a depressible actuating plunger 214 connected through an adjustable length coupling assembly 216 to the intermediate links 194 or 196. A first coiled compression spring 218 is disposed in a stepped bore 220 of a valve body 222 of each turn control valve, and is constructed to urge an intermediate retainer assembly 224 and the respective plunger 214 outwardly upon inward movement of the plunger from the neutral position thereof. A second coiled compression spring 226 is disposed within the first spring and is connected between the retainer assembly 224 and a shoulder 227 of a control spool 228 such that with inward movement of the retainer assembly the spool is resiliently urged inwardly. With inward movement of one of the control spools 228, or downward movement thereof when viewing FIG. 8, a plurality of internal passages 230 formed in the spool controllably communicate pressurized fluid in a supply port 232 with the respectively actuated pilot line 84 or 84. In FIG. 8 the plunger 214 is illustrated in a fully retracted position within a sleeve bushing 234 suitably locked in the valve body 222, and the inner end of the sleeve bushing serves as a stop for the retainer assembly 224 and the control spool 228. These control valves are preferably of a known construction such as the type fully described in U.S. Pat. No. 4,700,794 mentioned earlier.

INDUSTRIAL APPLICABILITY

In operation, when there is no manual force on the steering wheel 44, the torsion spring 122 will automatically urge the actuating post 128 to the centered position as shown in FIG. 6. Specifically, if the actuating post 128 is in the phantom position indicated by 128' the end portion 124 of the torsion spring will urge it in a clockwise direction when viewing FIG. 6 until the end portion 124 abuts the reaction post 130; and if it is in the phantom position indicated by 128" the end portion 126 will urge it in a counterclockwise direction. The larger diameter valve springs 218 shown in FIG. 8 will urge the retainer assemblies 224, the control spools 228, and the depressible actuating plungers 214 individually outwardly toward their respective neutral positions as is shown in FIG. 3. The force of the torsion spring 122 will center the actuating cam 94 and the steering wheel 44 by acting through the centering lever 114 and the input shaft 92 as can be appreciated by reference to FIG. 2, while the forces of the valve springs 218 will act through the intermediate links 194 and 196 and the bellcrank 174 to position the cam following roller wheel 100 in a centered position and with the inclined plane 210 being angularly located properly with the central plane 166 as shown in FIG. 3.

With the steering wheel 44 centered, the plungers 214 of the left and right turn control valves 48 and 50 will not be depressed. In such mode the pilot lines 82 and 84 are not pressurized and the conventional pump displacement control 64 of FIG. 1 is so positioned as to prevent fluid flow in the lines 60 and 62 connecting the steering pump 58 to the steering motor 54. This serves to hold the motor output shaft 56 and the second input drive member 32 stationary so that the planetary steering differential 28 can only drive the left and right output members 34 and 36 at the same speed and in the same direction, and thus the vehicle 10 in a straight ahead or longitudinal direction.

Assuming that a left turn of the vehicle is desired, the input shaft 92 is rotated in response to the initial movement of the steering wheel 44 by the vehicle operator. The centering lever 114 and the actuating post 128 are thereby rotated a corresponding amount in a clockwise direction about the central axis 101 when viewing FIGS. 4, 5 and 6 from the 12 o'clock neutral position thereof. This separates the end portion 126 of the torsion spring 122 angularly away from the reaction post 130 and begins to wind up the torsion spring. When looking at FIGS. 3 and 7, however, the input shaft 92 and the actuating cam 94 are initially rotated in the counterclockwise direction such that the cam following roller wheel 100 is caused to travel up the inclined ramp 156 or to move radially outwardly from the axis 101. As the roller wheel 100 is urged away from the central axis 101 the actuating arm 180 of the bellcrank 174 is rotated in a counterclockwise manner about the fixed pivot means 182 when viewing FIG. 3. The left leg 176 pushes the link 194 and the left actuating plunger 214 downwardly or into the valve body 222 whereupon the left compression spring 218 effects an increasing resistance to such movement. That loading causes a reaction on the bellcrank 174 such that the roller wheel is forced toward the central axis 101 and rides on the inclined ramp 156 and the first inner wall surface 152.

When the left actuating plunger 214 is pushed into the valve body 222, the right actuating plunger is pulled out of the valve body because the right leg 178 of the bellcrank 174 is moving away therefrom. When the right actuating plunger is pulled outwardly it is spaced away from the retainer assembly 224 as is shown in FIG. 8, there is no output from the right turn control valve 50 to the right pilot line 84, and there is no loading from the spring 218 thereof. On the other hand, the depression of the left actuating plunger 214 causes a controlled metering of the pressurized fluid in the manifold 72 and the supply port 232 to the other pilot line 82. The inclined ramp 156 is effective to move the roller wheel 100 and thus the left plunger 214 inwardly at a relatively fast rate corresponding, for example, to a rate of 0.189 mm per degree of rotation of the actuating cam 94 through a total range of movement from the centered position of approximately 4 or 5 degrees. Thereafter as the roller wheel 100 travels beyond the inclined ramp 156 and onto the more gradual spiral surface 152, the left actuating plunger 214 is depressed more gradually, for example, at a rate of 0.025 mm per degree of rotation of the actuating cam.

As the left actuating plunger 214 is depressed, the pressure in the pilot line 82 increases in direct proportion thereto. The pressure thereof passes through the diverter valve 78 and to the line 82' leading to one side of the pump displacement control 64. And since the pump displacement control is also connected to the source of pressurized fluid at approximately 2,400 kPa (350 psi) the pump displacement control 64 responds to that pilot signal and correspondingly adjusts the angle of the swash plate of the steering pump 58 to control the output thereof. The steering pump 58 is in fluid communication with the steering motor 54 through the pressurized line 60 and the unpressurized return line 62 so that the steering motor 54 and output shaft 56 rotates the second input drive member 32 at the desired rate and in the desired direction. The first input drive member 30 to the planetary steering differential 28 is simultaneously being driven by the transmission 18 at the selected speed rate, and the rotation of the second input drive member 32 is such as to decrease the speed of the left output member 34 and to increase the speed of the right output member 36 the same relative amount so that the vehicle 10 will turn to the left by virtue of the cooperating elements of the planetary steering differential.

A right turn is accomplished in substantially the same manner as a left turn, with the input shaft 92 and the actuating cam 94 being rotated in a clockwise direction rather than a counterclockwise direction when viewing FIG. 3. In this instance the cam following roller wheel 100 is forced to travel radially inwardly and the bellcrank 174 forced to rotate in a clockwise direction when viewing FIG. 3 whereupon the right actuating plunger 214 is depressed and thereby actuated and the left actuating plunger 214 is pulled outwardly into an inactive mode of operation. Pressurized fluid is then directed to the second or right pilot line 84 by the pressure reducing right turn control valve 50 for operation of the pump displacement control 64 so as to reverse the direction of the steering pump 58, the steering motor 54, and the steering input drive member 32. Rotation of the steering input drive member 32 in the opposite direction will decrease the speed of the right output member 36 and increase the speed of the left output member 34 the same relative amount to make a right turn.

When the cam following roller wheel 100 is moved radially toward the central axis 101 from the centered position thereof, the compression spring 218 of the right turn control valve 50 is forcing the bellcrank 174 in a counterclockwise direction about the pivot means 182 shown in FIG. 3. This urges the roller wheel 100 radially outwardly from the axis 101 in the guide slot 96 so that it positively rolls along the outer inclined ramp 162 and the outer wall surface 160.

Referring now to the centering and stop assembly 112 shown in FIG. 4, it can be appreciated that the inner actuating post 128 will abut or make contact with the freely hanging stop element 117 after approximately 180 degrees of rotation in either direction about the central axis 101. Thereafter, the actuating post 128 and the stop element 117 rotate together until the stop element abuts the reaction post 130. FIG. 5 illustrates the final positions thereof after full clockwise movement of the centering lever 114. In such location the circumferential width of the stop element serves to limit the maximum amount of travel of the input shaft 92, the actuating cam 94 and the steering wheel 44 to approximately 330 degrees. Thus, in FIG. 5, the angle A is approximately 30 degrees in the instant example. In the present invention the opposite end surfaces 170 and 172 of the guide slot 96 are disposed in excess of 180 degrees from the center of the central transition portion 168, and preferably in excess of 270 degrees therefrom, and the centering and stop assembly 112 so constructed and arranged as to limit the rotation of the actuating cam 94 so that the roller wheel 100 never contacts these end surfaces.

In view of the foregoing it can be appreciated that the steering mechanism 42 is simple in construction and reliable in operation. Particularly, the steering mechanism has a relatively low total number of parts which are individually easy to manufacture, and thus the steering mechanism is more economical and compact than the steering mechanism disclosed in previously noted U.S. Pat. No. 4,700,794.

Other aspects, objects, and advantages of this invention can be obtained from a study of the drawings, the disclosure, and the appended claims.

We claim:

1. A steering mechanism of a vehicle for converting the rotational movement of a steering input control member to the controlled displacement of a left turn control valve and a right turn control valve, comprising:
    an input shaft;
    a single actuating cam connected to the input shaft for joint rotation about a central axis in either direction away from a central position in response to rotation of the steering input control member, the actuating cam defining a single profiled guide slot having a central transition portion and a pair of end surfaces disposed oppositely away from the central transition portion; and
    cam follower means for controllably displacing the left and right turn control valves and including a cam follower element received in the single profiled guide slot.

2. The steering mechanism of claim 1 wherein the guide slot is of a substantially spiral shape and generally disposed in a plane normal to the central axis.

3. The steering mechanism of claim 2 wherein the end surfaces of the guide slot are individually disposed in excess of 180 degrees from the central transition portion.

4. The steering mechanism of claim 3 wherein the end surfaces of the guide slot are individually disposed in excess of 270 degrees from the central transition portion.

5. The steering mechanism of claim 2 wherein the central transition portion of the guide slot defines a radially outwardly facing inner inclined ramp and a radially inwardly facing outer inclined ramp of a construction sufficient for causing relatively rapid initial displacement of the actuating cam and thereby substantially greater initial movement of the left and right turn control valves as the actuating cam is moved away from the central position thereof.

6. The steering mechanism of claim 2 wherein the cam follower means includes a bellcrank defining first and second legs operatively connected to the left and right turn control valves respectively, an actuating arm supporting the cam follower element, and means for pivotally supporting the bellcrank.

7. The steering mechanism of claim 6 wherein the cam follower means includes a left intermediate link pivotally connected between the left turn control valve and the first leg of the bellcrank, and a right intermediate link pivotally connected between the right turn control valve and the second leg.

8. The steering mechanism of claim 1 including centering means for returning the actuating cam to the central position thereof and including a torsion spring generally encircling the input shaft.

9. The steering mechanism of claim 8 wherein the centering means includes a reaction post, and an actuating post connected for joint rotation with the input shaft and being adapted to load the torsion spring against the reaction post in either direction away from the centered position.

10. The steering mechanism of claim 9 wherein the centering means includes a stop element mounted for free pivotal movement about the central axis, the actuating post being adapted to urge the stop element against the reaction post in either direction of rotation of the input shaft in order to limit the rotational movement of the actuating cam to a preselected angular value away from the centered position.

11. A steering mechanism of a vehicle for converting the rotational movement of a steering wheel to the controlled displacement of a left turn control valve and a right turn control valve, comprising:
    an input shaft;
    an actuating cam connected to the input shaft for joint rotation about a central axis in either direction away from a central position in response to rotation of the steering wheel, the actuating cam defining a single profiled guide slot of a substantially spiral shape winding about the axis; and
    a cam follower assembly for simultaneously pulling one and pushing the other one of the left and right turn control valves and including a single cam follower element received in the profiled guide slot.

12. The steering mechanism of claim 11 wherein the guide slot includes a central transition portion and opposite end surfaces individually disposed in excess of 270 degrees from the central transition portion.

13. The steering mechanism of claim 12 wherein the substantially spiral guide slot includes radially outwardly facing first and second wall surfaces interconnected by an inner inclined ramp and radially inwardly facing wall surfaces interconnected by an outer inclined ramp.

14. The steering mechanism of claim 11 wherein the cam follower assembly includes a bellcrank defining first and second legs operatively connected to the left and right turn control valves respectively, an actuating arm supporting the cam follower element, and means for pivotally supporting the bellcrank.

15. The steering mechanism of claim 11 including a centering and stop assembly for returning the actuating cam to the central position thereof and including a torsion spring, a reaction post, and an actuating post connected for joint rotation with the input shaft and being adapted to load the torsion spring against the reaction post in either direction away from the centered position.

* * * * *